United States Patent [19]

Chard, Jr. et al.

[11] 4,390,093
[45] Jun. 28, 1983

[54] APPARATUS FOR CONVEYING SHEETS SUCH AS VENEER HAVING IMPROVED WICKET CONSTRUCTION

[75] Inventors: James W. Chard, Jr.; Timothy F. Corrigan, both of Vancouver, Wash.

[73] Assignee: Drying Systems, Inc., Vancouver, Wash.

[21] Appl. No.: 248,977

[22] Filed: Mar. 30, 1981

[51] Int. Cl.³ .............................................. B65G 47/86
[52] U.S. Cl. ................................. 198/654; 198/649; 271/204; 271/DIG. 10
[58] Field of Search ............... 198/644, 645, 649, 650, 198/654, 694; 271/DIG. 10, 204

[56] References Cited

U.S. PATENT DOCUMENTS

| | | |
|---|---|---|
| 1,439,702 | 12/1922 | Haseltine . |
| 1,815,372 | 7/1931 | Frazier .................... 198/650 |
| 2,821,286 | 1/1958 | Russell .................... 198/134 |
| 3,019,886 | 2/1962 | Winkler et al. ............ 198/134 |
| 3,079,704 | 3/1963 | Wassem .................... 34/150 |
| 3,276,569 | 10/1966 | Seedorf .................... 198/134 |
| 3,312,332 | 4/1967 | Glaze, Jr. .................. 198/131 |
| 3,353,279 | 11/1967 | Muller ...................... 34/150 |
| 3,605,992 | 9/1971 | Weber ....................... 198/134 |

Primary Examiner—Joseph E. Valenza
Assistant Examiner—Jonathan D. Holmes
Attorney, Agent, or Firm—Kolisch, Hartwell & Dickinson

[57] ABSTRACT

A sheet conveying apparatus which includes a conveyor operable for movement through an arcuate run and a substantially rectilinear run includes improved "wickets" defined by elongate arms which are carried by the conveyor and extend outwardly therefrom for transferring conveyor movement to a sheet of material, such as veneer. Each improved arm is provided with opposed sides which flex outwardly relative to one another during movement of an arm through the arcuate run. The advantage in such a construction results in a strengthened arm supported in cantilever manner during the arcuate run.

10 Claims, 3 Drawing Figures

APPARATUS FOR CONVEYING SHEETS SUCH AS VENEER HAVING IMPROVED WICKET CONSTRUCTION

BACKGROUND AND SUMMARY OF THE INVENTION

The present invention relates to conveying apparatus, and more particularly to a novel apparatus for conveying large, relatively flimsy sheets of material such as veneer or the like.

In the production of veneer, it is conventional, after peeling, to transfer the veneer through a dryer. A dryer includes a source of heat and suitable air moving equipment for moving warm air across the surfaces of the veneer to effect drying. One form of conveying apparatus for transferring veneer sheets through a dryer is the so-called "wicket" conveyor. Such a conveyor usually includes a pair of laterally opposed endless chains each of which is trained around opposed sprockets. A drive shaft connects the sprockets and is operable for moving the conveyor through arcuate and rectilinear runs. Mounted on top of the chains or suitably connected thereto are a series of elongate arms or "wickets" which are aligned in the direction of conveyance. As a wicket moves through the arcuate run, suitable infeed mechanism transfers a veneer sheet onto the top surface of the wicket and is carried therealong and through the upper rectilinear run which extends through the dryer. After a predetermined period of time, the sheet is transferred through the downstream arcuate run and is discharged onto an offbearing conveyor or the like.

A typical example of a so-called "wicket" construction used for the transfer of sheets is described in Seedorf, U.S. Pat. No. 3,276,569. The sheet handling mechanism disclosed in that patent includes wicket assemblies wherein each wicket is mounted on a mounting base to define an inclined plane for holding a sheet. A pair of fingers are mounted on the wicket above the base to define a pair of sheet edge supports. Each of the wicket assemblies includes a pair of members which are spaced-apart in a direction transverse to the direction of conveyance in order to provide sufficient support for holding a sheet. As the wicket assemblies move through an arcuate run to a horizontal run, they repose, in an inclined manner, one on top of another to hold the sheets.

Another conventional type of conveyor assembly using "wickets" is disclosed in Weber, U.S. Pat. No. 3,605,992. Also exemplary of known conveyors for transporting sheets is Russell, U.S. Pat. No. 2,821,286. Russell discloses a wicket construction in which each wicket assembly inclines relative to one another during the horizontal run through a dryer or oven. All of the references described thus far contemplate that the wicket assemblies will incline, one relative to another, so that sheet material will be permitted to bear against the inclined wicket.

A problem residing in conventional wicket-type conveyors resides in the fact that large, heavy wickets may be necessary to transport relatively large and thin sheets of veneer. Veneer sheets having a width in the range of 54 inches and lengths to 8 feet and above are heavy and unwieldy. When such sheets are loaded onto a wicket, as the wicket is being transferred through the arcuate run, the weight of the sheet will tend to bend the wicket downwardly so that the wicket will not properly catch and move the sheet upwardly for transferring it through the rectilinear run. It can be appreciated that a wicket, while it is being transferred through the arcuate run, is supported in cantilever manner by the conveyor. Thus, in those applications requiring long wickets, in order to accomodate reception of wide sheets of veneer, there is considerable bending stress placed upon the wicket.

With the above problem in mind, it is accordingly an object of the present invention to provide a novel wicket-type conveyor in which each of the "wickets", hereinafter referred to as arm means, is structurally enhanced so that during the arcuate run each will readily support a wide sheet of veneer. To this end, the present invention contemplates that each arm means is constructed as a pair of elongate members, which flex outwardly, one relative to the other, during movement of the arm means through the arcuate run. By "flexing" it is meant that the elongate members will bend or arc outwardly, relative to the longitudinal axis of the arm means so that a rigidified structure is provided. This rigidified structure, caused by the flexing action, will result in greater support for receiving a infed sheet during the arcuate run.

Additionally, it is an object of the present invention to provide an interconnected array of substantially similar arm means, pairs of which will spread apart for receiving an infed sheet during the arcuate run and which will return to an unflexed configuration for holding a sheet during the rectilinear run. In the unflexed configuration, adjacent pairs of arm means will hold a sheet in a substantially vertical position during the rectilinear run.

Still another object of the present invention is to provide an array of interconnected arm means, each of which includes a pair of elongate members spaced-apart from one another and connected adjacent their outer ends. Conversely, the ends of the arm means which are secured to the conveyor angulate, one relative to the other, during the arcuate run so as to flex the elongate members outwardly relative to one another. The flexing action is created because the outer ends of the elongate members of each arm means are connected to one another.

These and additional objects and advantages of the present invention will be more readily appreciated from a consideration of the drawings and the detailed description of the preferred embodiment.

DETAILED DESCRIPTION OF THE PREFERRED EMBODIMENT

Figure 1:
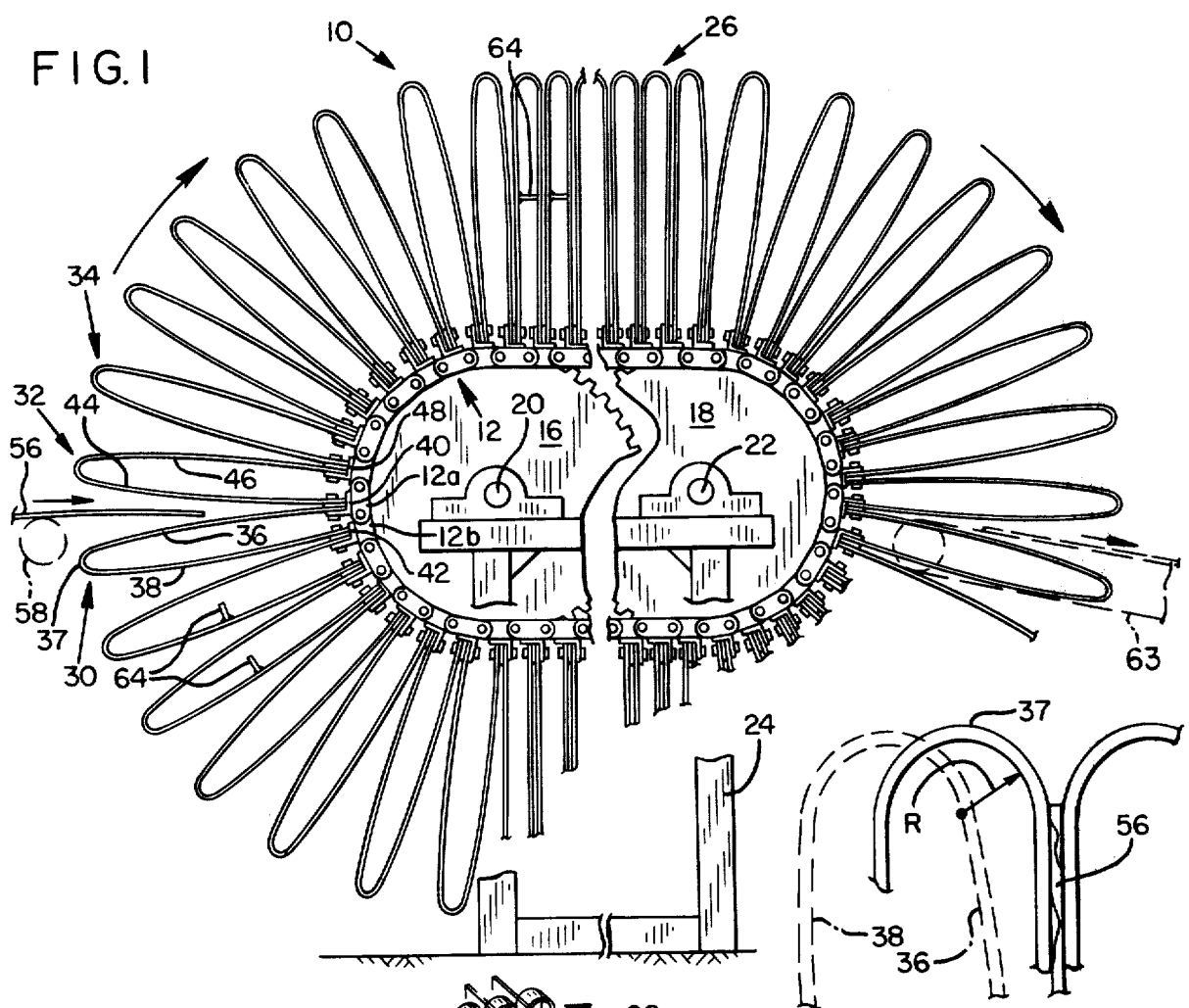
FIG. 1 is a side elevational view of a sheet conveying apparatus showing an array of aligned arm means according to the present invention.

Reference is now made to the drawings, and initially to FIG. 1, wherein a sheet conveying apparatus including a conveyor, according to the present invention is shown generally at 10. The sheet conveying apparatus includes a conveyor having a pair of laterally opposed, endless chains one of which is indicated at 12 and the other at 14 as shown in the perspective view of FIG. 2.

Endless chain 12 is trained over opposed sprockets 16, 18 which are suitably mounted on laterally opposed shafts such as indicated at 20, 22, respectively. For the purpose of indicating that such a sheet conveying apparatus is disposed above a floor, portions of a supporting frame structure are somewhat schematically indicated at 24. It is to be understood that one of the shafts, such as shaft 20, is suitably power-driven for rotating the sprockets 12, 14 in a suitable direction, such as indicated by the clockwise directed arrows, so that motion is imparted to the chains.

Figure 2:
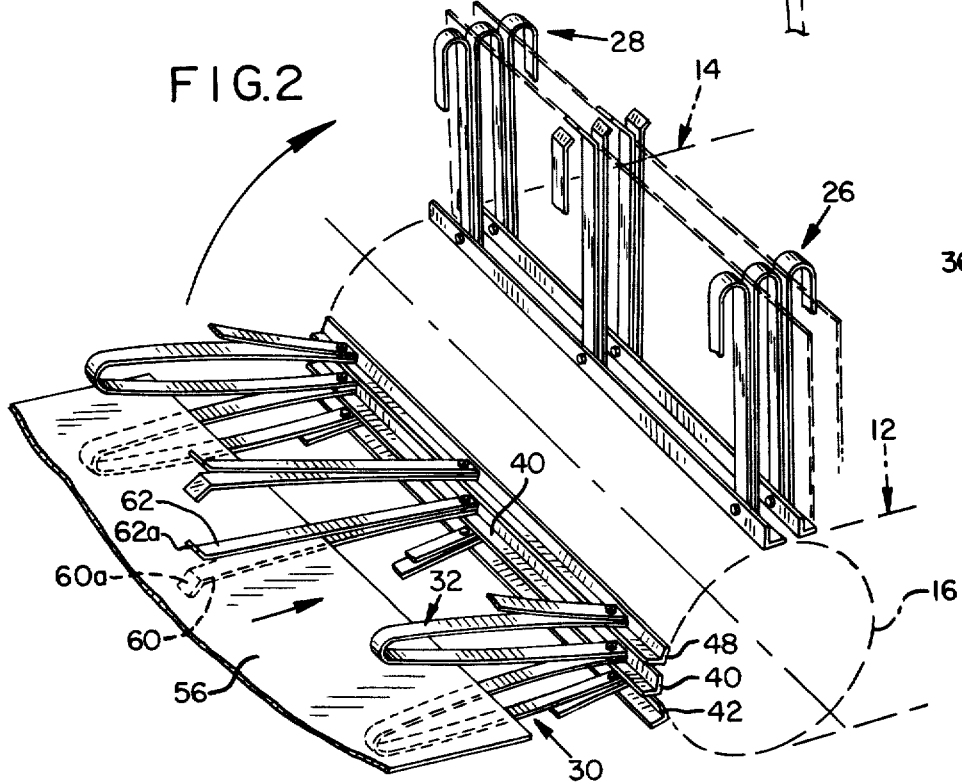
FIG. 2 is a perspective view of a portion of the sheet conveying apparatus illustrating a veneer sheet being fed between adjacent arm means during an arcuate run.

Additionally, for purposes of definition, it can be seen that the portion of the chains which travel along the left side of sprocket 16, as seen in FIGS. 1 and 2, will be referred to as an arcuate run while that portion of movement of the conveyor along the top of the run will be referred to as a substantially rectilinear run. It is also noted that the chains move in an additional arcuate run, as can be seen from a consideration of the right-hand portion of FIG. 1 as well as a bottom rectilinear run. For purposes of conserving space in the drawings, the rectilinear runs of the conveyor have been cut across their length so that further details of the present invention may be accurately illustrated.

More particularly, and as referred to previously, the present invention is directed to the provision of a novel "wicket" construction, and more particularly to a specific arrangement of parallel arrays of sheet holders or "arm means" which are used to engage and transport sheet material such as veneer. Explaining further, it can be seen that a first array of arm means, generally indicated at 26, is mounted on the near side of conveyor 10 and a second array of arm means indicated at 28 is mounted on the opposite side of conveyor 10 (see FIG. 2). Considering first array 26, it can be seen that it includes a plurality of substantially identical, interconnected arm means, such as those indicated generally at 30, 32, 34, etc. The arm means provided in second array 28 are substantially identical. It is to be understood that FIGS. 1 and 2 may be somewhat out of scale, in that the arm means would normally extend outwardly much further from conveyor 10 than that shown in FIGS. 1 and 2. However, in order to provide views which accurately illustrate the arm means, and their relation to the conveyor, it is deemed necessary to shorten the arm means somewhat.

Describing now the arm means, and in particular arm means 30, it can be seen that it is carried on conveyor 10 and extends outwardly therefrom. Arm means 30 includes a pair of spaced-apart and opposed elongate members such as first elongate member 36 and second elongate member 38. First elongate member 36 has one end thereof secured to a first mounting means such as indicated at 40 with second elongate member 38 being secured to a second mounting means indicated at 42. Each of the mounting means preferably is formed as an elongate angle member which is mounted on a separate link. For instance, it can be seen that mounting means 40 is mounted on link 12a and mounting means 42 is mounted on link 12b. Each of the mounting means extends across the lateral dimension of conveyor 10 so that an aligned arm means, on the opposite side of conveyor 10 (as shown in FIG. 2) may also be secured thereto. It is to be noted also that each of the mounting means accommodates connection thereto of an elongate member from an adjacent or aligned arm means in the same array. For instance, it can be seen that arm means 32 includes spaced-apart elongate members 44, 46.

Elongate member 44 is connected to first mounting means 40 and elongate member 46 is connected to a third mounting means 48. Mounting means 48 is secured to another link and in a similar manner, all of the remaining arm means, such as arm means 34, etc., are connected to associated mounting means.

Thus, it can be seen that first array 26 includes arm means each of which includes an elongate member connected to a mounting means which also is connected to an elongate member of an adjacent arm means. This construction can be more readily appreciated from a consideration of FIG. 3, which, for purposes of description, shows mounting means 40 (as such would be positioned during the rectilinear run) with elongate members 36, 44 secured thereto by means of a nut and bolt assembly generally indicated at 50. Sandwiched between elongate members 36, 44 is a spacer element 52 the purpose of which will be described at a later point. Also, it is to be noted that mounting means 40 is detachably secured to a block such as indicated at 54 which, in turn, may be welded or otherwise suitably secured to an associated link.

Figure 3:
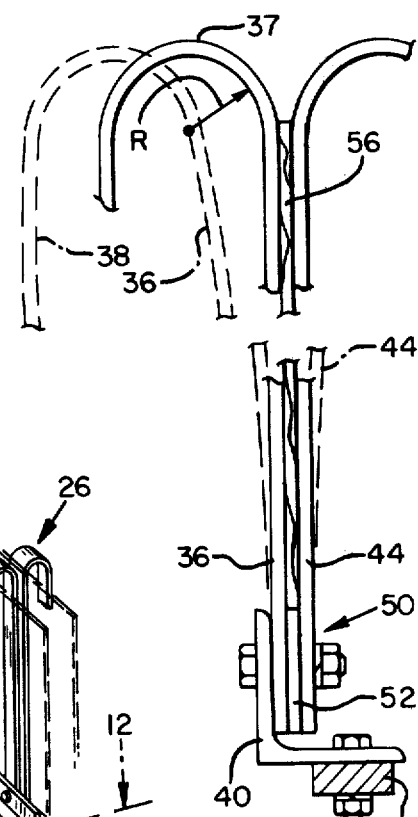
FIG. 3 is an enlarged view of a portion of an adjacent pair of arm means.

Turning now to a further description of the arm means, and a particular arm means 30, it can be seen that elongate members 36, 38 are interconnected adjacent their outer ends by an arcuate segment 37. It has been found preferable to form the arm means as a unitary member bent to form arcuate segment 37. As shown in FIG. 3, arcuate segment 37 is dimensioned with a radius such as indicated at R generally corresponding to one half of the spacing between the inside surfaces of the elongate members when such are disposed in the vertical position which they assume during the rectilinear run. While the interconnection between the elongate members of an arm means is shown to be arcuate, such as arcuate segment 37, the important point to note is that the elongate members are connected together. This connection, which, as mentioned before, is in the form of an arcuate portion at the outer ends of the elongate members, enables "flexing" of the elongate members as an arm means travels through an arcuate run.

Explaining further, it can be seen that because each adjacent pair of mounting means, such as first and second mounting means 40, 42, respectively, are mounted on different link, each of the mounting means will angulate, one relative to another, during the arcuate run. Isolating arm means 30, it can be seen that because first and second elongate members 36, 38 are secured to separate mounting means, such as first and second mounting means 40, 42, respectively, the assumed angulation of the links, during travel through the arcuate run, will be transferred to the mounting means and hence to the elongate members because the elongate members are connected together at their outer ends. The assumed angulation which is transferred will "flex" each of the elongate members, such as first and second elongate members 36, 38 respectively. The flexing action results in opposed outer sides of first and second elongate members 36, 38 being biased into a bow or arc outwardly relative to one another during movement of arm means 30 through the arcuate run. The arc which is formed creates a more rigid overall structure for the arm means.

Thus, as a sheet of material, such as a veneer sheet 56 is fed by means of an infeed conveyor 58 into a throat defined between first elongate member 36 and elongate member 44 of arm means 32, the sheet will eventually be picked up by first elongate member 36 and supported thereon. First elongate member 36, because it is bowed outwardly is provided with substantially greater structural integrity than if only a single elongate member were used. This is especially important when it is recognized that relatively wide sheets of material, ranging anywhere from 27 to 54 inches and upwardly, are fed into the conveyor. Because arm means 30 is supported in cantilever manner during the arcuate run, it is necessary to provide the support as described.

As also can be seen from a consideration of FIG. 1, the flexing of adjacent elongate members 36, 44 also tends to open up the throat so that a predictable wide opening is provided for receiving veneer sheet 56. As shown in FIG. 2, arm means adjacent chain 14, are laterally opposed and aligned with corresponding arm means on chain 12 so that throats are presented for receiving a sheet of veneer. Still viewing FIG. 2, it can be seen that an intermediate array of "wickets" are provided for also receiving a leading edge of veneer sheet 56. Side-by-side positioned slat members such as indicated at 60, 62, are provided with inclined leading edges such as indicated at 60a, 62a, respectively. The elongate slats are connected adjacent their innermost ends to mounting means 40. While it is contemplated that the intermediate or central array of "wickets" might also be formed with the configuration of the arm means shown at 30, 32, 34, etc., single slat members such as shown in FIG. 2 may be preferable when an extremely thin sheet of veneer is to be received. By "thin" it is meant sheets such as 1/10 or 1/20 of an inch thick, which are extremely flimsy, and thus it is desired to prevent buckling of such sheets, across the longitudinal axis thereof, as such sheets are fed into conveyor 10 by infeed conveyor 58. Generally, it would be assumed that for more standard veneer sheets with sheet thickness of ⅛, 1/6 or 3/16 of an inch, arm means such as those indicated 30, 32, etc., may be provided for the intermediate array.

Considering now further operational features of the conveying apparatus of the present invention, and in particular how adjacent pairs of arm means cooperate, it will be presumed that sheet 56 has been received on top of first elongate member 36, and supported thereon as arm means 30 moves through the arcuate run. It should be understood that preceding arm means 30, along the arcuate path, is arm means 32. As arm means 30, 32 begin to approach the vertical, sheet 56 will be supported on top of spacer 52 (similar spacers are also provided on second array 28 and the intermediate array). Further, as mounting means 48 and 40 become aligned in the direction of conveyance in the rectilinear run, elongate members 44, 46 assume a substantially parallel orientation relative to one another. As second mounting means 42 moves into alignment, in the direction of conveyance with first mounting means 40 in the rectilinear run, first elongate member 36 becomes substantially parallel with second elongate member 38 as well as parallel with elongate member 44 of arm means 32.

The result, assuming that the thickness of spacer 52 is somewhat close to the thickness of veneer sheet 56, is that opposed elongate members on adjacent arm means tend to close toward and be urged against the opposed faces of the veneer sheet. This is shown in FIG. 3 where it can be seen that first elongate member 36 and elongate member 44 are positioned substantially parallel to one another and lie closely adjacent to the opposed faces of veneer sheet 56. Assuming that corresponding arm means of second array 28 perform the same function, it can be seen that the veneer sheet is held substantially vertically and maintained with its opposed faces also vertically oriented. This is particularly important when it is realized that extremely thin sheets tend to buckle if they are not held on their opposed faces.

As shown in FIG. 3, bottom portions of the elongate members which are mounted on a common mounting means are positioned so that they are maintained relatively parallel even during the "flexing" action which occurs during the arcuate run. Assuming that the arm means are each constructed of steel, it can be seen that a veneer sheet, such as indicated at 56, will be gripped or maintained relatively tightly to prevent wrinkling during movement in the rectilinear run during the drying process. Additionally, as can be appreciated from a consideration of FIGS. 1 and 2, sheets of veneer will be maintained substantially vertically during the rectilinear run prior to their discharge from between opposed elongate members of adjacent pairs of the arm means to an outfeed conveyor indicated at 63. It is important to maintain the veneer sheets in a substantially vertical position with opposed surfaces of the sheets being maintained in a somewhat "sandwiched" position to prevent the aforementioned occurrence of wrinkling.

Thus, what has been described, is a novel arm means for use on a sheet conveying mechanism and more particularly the arrangement of a plurality of arm means which are arranged in aligned arrays in the direction of conveyance. Additional arrays, such as second array 28, are provided so that a veneer sheet may be received between facing, adjacent arm means in each array. By providing the arm means with interconnected elongate members which are connected to independently movable mounting means, the elongate members "flex" due to the relative angular orientation of the mounting means during the arcuate run. The flexing action tends to splay or spread apart facing elongate members on adjacent arm means so that an open throat is presented for receiving a veneer sheet. Additionally, as can be appreciated from a consideration of FIG. 1, arcuate portion 37 provides a gradual entry adjacent the end of first elongate member 36. Thus, if the timing between the infeed of sheet 56 and the movement of arm means 30, 32 is not as precise as required, the leading edge of veneer sheet 56, as it is fed into the throat between first elongate member 36 and elongate member 44, is guided over the gradual, curved surface of arcuate segment 37 into the throat.

Another advantage of the present invention resides in the fact that each arm means is supported so that it may accommodate sheets of relatively wide width. For instance, with elongate member 36 assuming a longitudinally convex profile or arching as shown, structural integrity is provided which will enable arm means 30 to support a wide sheet.

Another unique feature of the present invention is the fact that the "wickets", such as arm means 30, 32, 34 are all interconnected or "tied together" in each array. For instance, it can be seen that adjacent pairs of arm means, such as arm means 30 and 32 have adjacent facing sides such as elongate members 36, 44 which are rigidly connected or tied together to a common mounting means such as first mounting means 40. As illustrated in the drawing figures, this pattern is consecutively repeated so that an array, such as first array 26 is formed of individual arm means structurally integrated. Of course, as mentioned previously, the primary advantage of having a pair of opposed elongate members, such as first and second elongate members 36, 38 respectively forming a common arm means results in the fact that the aforementioned "flexing" action occurs which creates a cantilever supported during the arcuate run structurally much stronger than if a single elongate member were employed. Additionally, it is to be noted that it may be necessary in some applications to provide intermediate spacers, such as indicated at 64 secured to and extending from one of the elongate members toward the other so that elongate members on a common arm means do not bow inwardly during the rectangular run. While normally this should not present a problem, it is nonetheless deemed important to maintain opposed elongate members, on adjacent arm means substantially upright during the rectilinear run so that a sheet of veneer is sandwiched therebetween.

While the present invention has been shown and described with the foregoing preferred embodiment, it will be appreciated that changes in form and detail may be made without departing from the spirit and scope of the invention as defined in the appended claims.

It is claimed and desired to secure by Letters Patent:

1. In sheet conveying apparatus including a conveyor operable for movement through an arcuate run and a substantially rectilinear run, the improvement comprising:

elongate arm means carried by the conveyor and extending outwardly therefrom for transferring conveyor movement to a sheet, said arm means including first and second, spaced-apart elongate members which flex outwardly relative to one another during movement of said arm means through the arcuate run, said elongate members being interconnected adjacent their outer ends, and means for mounting said elongate members including first and second mounting means provided on the conveyor which angulate one relative to the other during the arcuate run and which align in the direction of conveyance during the rectilinear run, said first and second elongate members being mounted on and extending outwardly from said first and second mounting means, respectively.

2. The sheet conveying apparatus of claim 1 wherein said first and second elongate members are interconnected by means of an arcuate segment.

3. The sheet conveying apparatus of claim 2 wherein said arcuate segment extends from said first and second elongate members to present a gradual leading edge for a sheet fed toward said arm means.

4. The sheet conveying apparatus of claim 3 wherein said arcuate segment is dimensioned with an inside radius generally corresponding to one-half the inside spacing between said first and second elongate members during the rectilinear run.

5. The sheet conveying apparatus of claim 4 wherein said arm means is formed from a single member bent to form said arcuate segment.

6. The sheet conveying apparatus of claim 2 further including a third mounting means and an additional arm means, said third mounting means being provided on the conveyor which angulates relative to said first and second mounting means during the arcuate run and which aligns therewith, in the direction of conveyance during the rectilinear run, said additional arm means being defined by an elongate member mounted on said first mounting means and another elongate member spaced apart therefrom mounted on said third mounting means, said elongate members of said additional arm means being interconnected adjacent their outer ends.

7. The sheet conveying apparatus of claim 6 further including a spacer element interposed between end portions of said first elongate member and the elongate member of said additional arm means mounted on said first mounting means, said spacer element being dimensioned so that a sheet may be received between said arm means and said additional arm means during the arcuate and rectilinear runs.

8. In sheet conveying apparatus including a conveyor operable for movement through an arcuate run and a substantially rectilinear run, the improvement comprising:

first and second arrays of arm means carried by the conveyor and laterally spaced-apart thereon extending outwardly therefrom for transferring conveyor movement to sheets, each array being defined by a plurality of adjacent arm means aligned in the direction of conveyance, each arm means including a pair of spaced-apart elongate members which are interconnected adjacent their outer ends and which are connected to an elongate member of an adjacent arm means.

9. The sheet conveying apparatus of claim 8 wherein each arm means is formed so that its elongate members flex outwardly relative to one another during movement of said arm means through the arcuate run and which align, substantially parallel to one another during the rectilinear run.

10. The sheet conveying apparatus of claim 9 wherein adjacent pairs of arm means of a common array include opposed elongate members which receive a sheet therebetween, said opposed elongate members closing toward a sheet during the rectilinear run and splaying from one another during the arcuate run.

* * * * *